July 17, 1956     A. K. MARSH ET AL     2,754,751
AUTOMATIC MACHINE FOR PUNCHING AND PRINTING
MULTI-SECTION PRICE TICKETS
Original Filed April 11, 1951     11 Sheets-Sheet 6

INVENTORS

A. K. MARSH ET AL 2,754,751

AUTOMATIC MACHINE FOR PUNCHING AND PRINTING
MULTI-SECTION PRICE TICKETS

Original Filed April 11, 1951

INVENTORS

BY

ATTORNEYS

July 17, 1956     A. K. MARSH ET AL     2,754,751
AUTOMATIC MACHINE FOR PUNCHING AND PRINTING
MULTI-SECTION PRICE TICKETS
Original Filed April 11, 1951     11 Sheets-Sheet 11

United States Patent Office 2,754,751
Patented July 17, 1956

2,754,751

AUTOMATIC MACHINE FOR PUNCHING AND PRINTING MULTI-SECTION PRICE TICKETS

Alonzo K. Marsh, Ridgewood, N. J., Harry E. Rothmann, Valhalla, N. Y., and Joseph Weimont, Bogota, N. J., assignors to A. Kimball Company, New York, N. Y., a corporation of New York Original application April 11, 1951, Serial No. 220,492. Divided and this application August 13, 1954, Serial No. 449,544

5 Claims. (Cl. 101—19)

This invention relates to automatic machines for punching and marking multi-section price tickets.

A very recent development that has finally made possibly a practical method for the preparation of buying, sales, inventory and other accounting and statistical information mechanically and in an accurate, speedy and economical manner, is the merchandise price tag consisting of detachable multi-sections on which the desired information is not only printed but also punched in code, the punched coding of a tag section being subsequently used to actuate special sensing devices which in turn actate automatic punch machines to produce standard tabulating cards. Such a tag is disclosed in the co-pending application of Alonzo K. Marsh, Serial No. 117,330, filed September 23, 1949.

Thes application is a division of our co-pending application Serial No. 220,492, filed April 11, 1951.

It is an object of this invention to provide an automatic machine for marking and punching such tickets, or any tickets where various lines of legends are to be applied along with punched coding characters corresponding to the legends marked on the ticket.

Another object of the invention is to provide a machine in which marking and punching heads, having a number of adjustable digit wheels, are set and adjusted from a manually operated selector which controls both the marking and punching heads simultaneously. In the preferred embodiment of the invention, duplicate markings are applied to all sections of a multi-section ticket, and corresponding coding characters are punched in at least one section of the ticket, all under the control of a common selector.

In order to place a substantial amount of information on a ticket of small size, this invention employs marking heads on both sides of the ticket, and preferably with the lines of marking on the opposite side staggered so that all of them can be represented by corresponding coding characters punched through the ticket on the same line as the markings. The space between the lines of marking provides clearance for printing wheels that can be turned to bring any desired figure or other legend into marking position.

Other features of the invention relate to the punching of coding characters from opposite sides of the ticket in such a way that the sensing machines can operate from one side of the tickets regardless of whether the coding characters represent a line of marking on the front or back of the ticket. This result is obtained by having some of the coding characters read in the reverse order from the sequence of figures or letters that they represent.

Another object of the invention is to provide improved apparatus for feeding successive tickets into accurate and uniform positions at a coding station. When coding characters consist of small holes, as with this invention, satisfactory results require extremely accurate and uniform positioning of each ticket at the coding station of both the marking and the sensing machines. Features of the feed mechanism relate to the use of feed pins substantially larger than the coding character holes, and to the location of the pins; and in the preferred embodiment of the invention, other features relate to the feeding of the tickets for successive printing on one or both sides, to a stop mechanism for advancing strips of tickets during the time when only the forward or rearward end of the ticket strip is on the platen of the machine.

Still other features are concerned with the relation of the marking and punching operations in the time cycle of the machine and to apparatus by which the machine can be quickly and conveniently adjusted for different marking and coding characters, with assurance of registry of the markings along straight lines on the ticket.

Another object of the invention is to provide an improved automatic ticket marking and/or punching machine of the class which operates on a strip of tickets and requires two cycles of operation to complete each ticket. Improved features of the machine include apparatus for severing the tag strip under the control of a counter after a predetermined number have been fed to the machine, and for continuing the feeding of unfinished tickets that have been severed from the tag strip, until the last ticket has been marked and/or punched.

Other objects, features and advantages of the invention will appear or be pointed out as the description proceeds.

In the drawings, forming a part hereof, in which like reference characters indicate corresponding parts in all the views.

The machine shown in the drawing is equipped to print five lines of figures on each section of the ticket, and to punch five lines of coding characters, corresponding to the lines of figures on the ticket along the same lines as the figures with which the coding characters correspond. Three lines of figures are printed on the upper surface of the ticket, and two lines on the lower surface in staggered relation with the marks on the upper surface.

Figure 1:
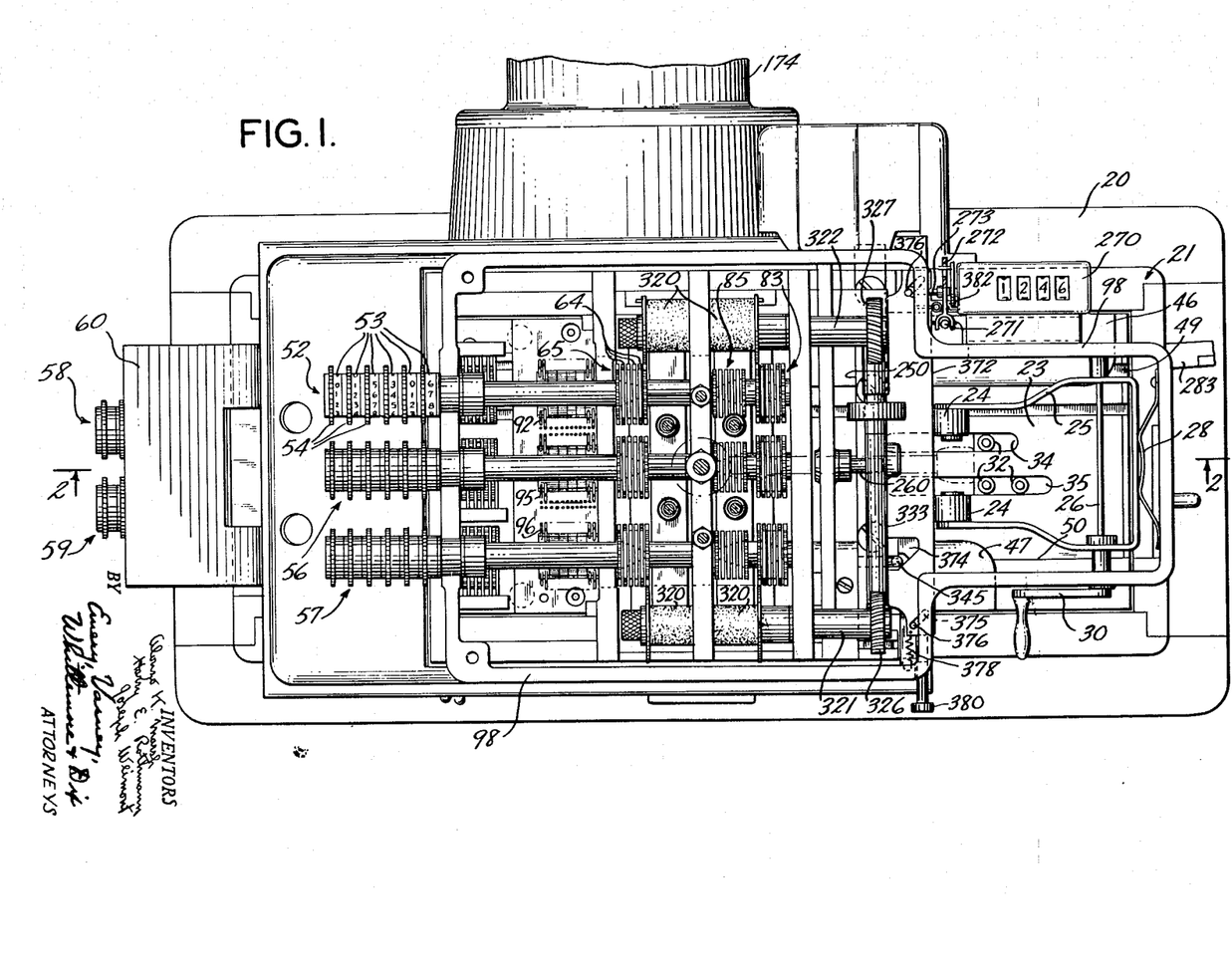
Fig. 1 is a top plan view, with the cover assembly removed, of a ticket marking and punching machine made in accordance with this invention, the view being taken along the line 1—1 of Fig. 2.
Figure 2:
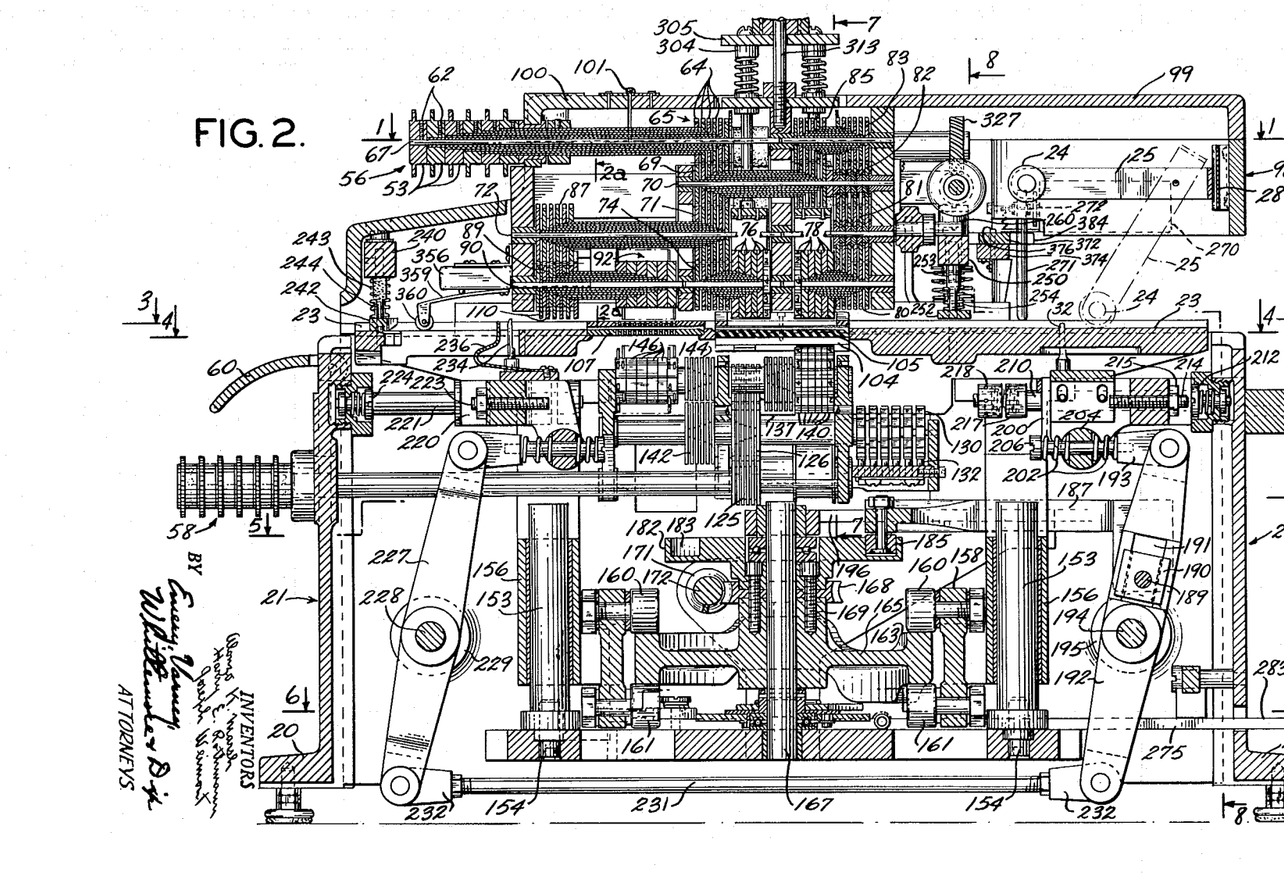
Fig. 2 is a vertical sectional view taken on the line 2—2 of Fig. 1.

Referring first to Fig. 1, the machine includes a base 20, and a housing 21 rigidly connected to, and preferably integral with, the base. The machine has a flat table or platen 23 on which the strip of tickets rests and along which the strip is fed with a step by step movement during the operation of the machine. There are rollers 24 carried by a light weight bracket 25 which swings about an axle 26 to move the rollers 24 downwardly into contact with a strip of tickets on the platen. A leaf spring 28, connected to the upper portion of the housing 21 holds the bracket 25 with the rollers 24 in an elevated position, as shown in Fig. 2, or urges the rollers 24 downwardly against a row of tickets on the platen 23 when the bracket 25 is swung downwardly from its horizontal position. The bracket 25 is shown in dotted lines in the position which it occupies when the rollers 24 are in contact with a strip of tickets on the platen.

Referring again to Fig. 1, the bracket 25 is moved about its axle 26 by a crank 30. There are three pins 32 extending upwardly through slots 34 and 35 in the platen 23. These pins 32 reciprocate back and forth in the direction in which the slots 34 and 35 extend. The platen 23 is raised and lowered in timed relation with the strokes of the pins 32 so that the platen holds the strip of tickets above the level of the pins 32 during rearward movement of these pins (toward the right in Fig. 1).

The platen descends to a level below the upper ends of the pins 32 before these pins start their forward movement (toward the left). This permits the pins to engage in feed openings in the price tickets so that the strip of tickets is fed forward during the next movement of the pins 32. This stroke is repeated with each cycle of operation of the machine and the stroke of the pins 32 is sufficient to advance the strip of tickets for a distance equal to the width of one ticket.

Figure 9:
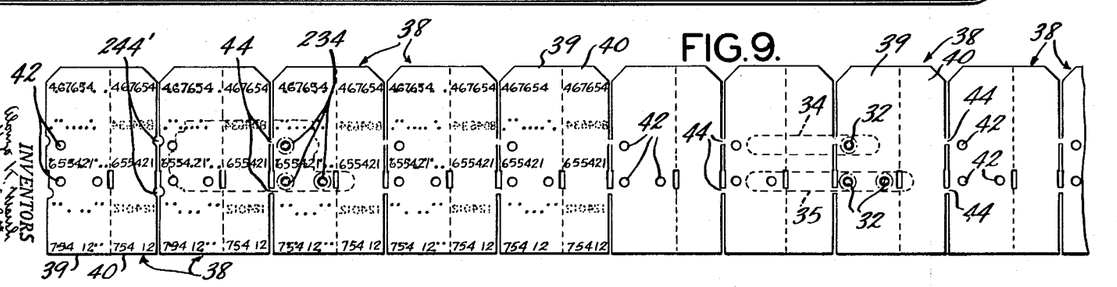
Fig. 9 shows a strip of tickets and illustrates the way in which they are marked and punched by the machine shown in the other figures.

A strip of tickets is shown in Fig. 9. In this figure the individual tickets are indicated by the reference character 38, and each ticket consists of two sections 39 and 40. There are openings 42 in position to be engaged by the feed pins 32; and Fig. 9 shows the feed pins 32 engaging one of the tickets 38. Each ticket is connected with the next adjacent ticket by lands 44 which are of very limited vertical extent, and which are punched out by cut-off mechanism to separate successive tickets from the strip at the discharge end of the machine.

Referring again to Fig. 1, the platen 23 has a spring plate 46 under which the upper ends of the tickets are placed, and has a similar spring plate 47 under which the lower edges of the tickets come as the tickets advance along the platen. This plate holds the tickets down flat on the platen. There are guide ridges 49 and 50 along opposite edges of the platen for preventing displacement of the ticket strip transversely of its direction of movement along the platen.

There are three groups of selector wheels for adjusting the machine to mark and punch the desired permutations of figures for the top surfaces of the tickets. The first selector wheel group 52 includes six wheels 53. Each of these wheels has a flange 54 by which the wheel can be conveniently turned manually. These flanges are spaced from one another so that the operator's fingers can turn any one of the wheels 53 without interfering with the setting of the adjacent wheels. Each of the wheels 53 has numbers at angularly spaced regions around its circumference, and when a particular number is at the top of the wheel, the printing and punching wheels which that selector wheel controls are set in position to print and punch numbers and coding characters, respectively, corresponding to that number.

The selector wheel group 52 controls the numbers and coding characters marked and punched on the top row of each ticket, other selector wheel groups 56 and 57 control the numbers and coding characters marked and punched on the third and fifth lines of each ticket. The second and fourth lines of each ticket is marked on the bottom surface of the ticket, and the printing heads and punching heads for the second and fourth lines operate from below the strip of tickets.

Selector wheel groups 58 and 59 are used to set the printing and punching heads for the second and fourth lines. These selector wheel groups 58 and 59 are similar in all respects to the selector group 52, already described. In Fig. 1, they are partially covered by a discharge chute 60 at the delivery end of the platen. This chute 60 can be swung upwardly and out of the way when the selector wheel groups 58 and 59 are being used to change the setting of the printing and punching heads for the second and fourth lines on the tickets.

Fig. 2 shows the way in which each of the selector wheels 53 is connected by a set screw 62, with a shaft extending to gear wheels 64 of a driving gear group 65. The left hand selector wheel 53 is connected to the right hand driving gear 64 by a solid shaft 67. The next selector wheel 53 is connected to the next driving gear 64 by a tube that rotates on the solid shaft 67 as a bearing. Each successive selector wheel 53 is connected with a successive driving gear 64 by a progressively larger tube which turns on the tube within it as a bearing.

This construction, commonly referred to as a "quill shaft," connects each of the selector wheels 53 with one of the driving gears 64, but in reverse order, that is, the right hand selector wheel 53 is connected to the left hand driving gear 64.

Each of the gears 64 of the driving group 65 meshes with a corresponding gear of a transfer group 69 on a shaft 70. The gears of this transfer group 69 mesh with corresponding gears of an intermediate group 71 supported on an axle 72. The individual gears of the intermediate group 71 mesh with corresponding gears of a print wheel group 74, and each gear of the print wheel group 74 is connected with one of a corresponding number of print wheels 76.

The connections between the gears of the print wheel group and the print wheels 76 are by means of quill shafts, similar to, but shorter than those connecting the selector wheels 53 to the driving gears 64. There is, therefore, a reversal of order, that is, the right hand print wheel gear 74 connects with the left hand print wheel 76. This reversal counteracts the reversal brought about by the connections between selector wheels 53 and the driving gears 64 so that the combined effect leaves the right hand selector wheel 53 in control of the right hand printing wheel 76, and the left hand selector wheel 53 in control of the left hand printing wheel 76, and all other selector wheels 53 controlling the printing wheels 76 in the same order as the selector wheels. Thus, a sequence of numbers reading from left to right in the setting of the selector wheels 53 causes the printing wheels 76 to print the same sequence of numbers, reading in the same direction, on the top surface of the ticket.

There is a duplicate printing head comprising printing wheels 78 in position to print on the rearward section of each ticket at the same time that the printing wheels 78 are printing on the forward section of the ticket. The printing wheels 78 are connected by quill shafts with gears of a right hand printing wheel group 80. These gears of the group 80 are driven through gear trains comprising groups of gears 81 and 82 which are in turn driven by gears of a transfer group 83.

Each of the gears of the transfer group 83 is connected by quill shafting to corresponding gears of a transfer driving group 85 and these gears of the transfer driving group 85 are driven by gears of another group at the right hand end of the shaft 70. This combination of quill shafting, transfer gears and idlers makes the selector wheels 53 adjust the printing wheels 78 simultaneously with the printing wheels 76 and in the same order, that is, the right hand selector wheel 53 sets both the right hand printing wheel 76 and the right hand printing wheel 78. Thus, the printing head comprising the wheels 78 prints figures in the same order as the printing head comprising the wheels 76.

The gears of the intermediate group 71, in addition to driving the printing wheel group 74, are connected by quill shafting to a gear group 87 which in turn meshes with gears of another gear group 89 supported by a shaft 90. The gears of the group 89 are connected by quill shafting with punching wheels 92. The combination of gearing through which the punching wheels 92 are rotated from the selector wheels 53 makes the right hand selector wheel 53 control the left hand punching wheel 92, and the other punching wheels 92 are set by the selector wheels 53 in the same order so that the coding characters punched by the wheels 92 through the top of the card read in the reverse order as the figures printed by the printing heads comprising the groups of wheels 76 and 78.

Figure 10:
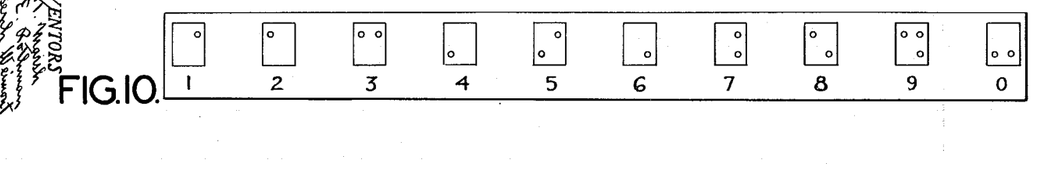
Fig. 10 is a diagram illustrating the code used for the coding characters punched by the machine.

Each of the punching wheels 92 consists of a disk having punches extending from it in position to punch holes at different locations and in different combinations, as illustrated in Fig. 10. Other codes can be used, but it is a feature of the invention that the punching wheels 92 punch coding characters corresponding to the figures printed by the printing heads consisting of the groups of printing wheels 76 and 78.

It will be understood that the other selector wheel groups 56 and 57 (Fig. 1) adjust other printing and punching heads corresponding to those already described in connection with Fig. 2. The selector wheel group 56 controls the wheels of a punching head 95, and the selector group 57 controls the wheels of a punching head 96. The printing heads that are controlled by the selector groups 56 and 57 are not shown in Fig. 1 because they are under the other structure shown in the drawing.

The printing and punching heads, the selector wheel groups 52, 56 and 57, and all of the motion transmitting connections, through which these selector wheel groups control the setting of the printing heads and punching heads, are carried by an upper cage 98 which is a rigid part of the housing 21. The printing and punching heads, therefore, do not move downwardly into contact with the price tickets, but it is the upward and downward movement of the platen 23 that brings the tickets into and out of contact with the printing and punching heads. The cage 98 has a cover 99 which can be removed for access to the parts within the cage, and one end of the cover 99 has a door 100 connected with the remainder of the cover by a hinge 101.

Referring further to Fig. 2, the platen 23 has a pad holder 104 with a slot in it through which the strip of tickets passes. This holder 104 has resilient pads 105 located under the printing heads below each line of printing that is marked on the top surface of each ticket. The holder 104 also has two resilient pads located above the strip of tickets in position to back up the lines of printing by the printing heads that are below the platen, which have not yet been described. There is a die plate 107 carried by the platen and having holes in all of the positions in which a coding character may be punched. These holes in the die plate have tapered entrances such as those shown under the punching wheels 92. Corresponding holes with the tapered entrances at the lower ends are located over the punching wheels that are below the platen 23 and that have not yet been described. The die plate 107 has a slot through which the strip of tickets passes.

The holes with tapered entrances above the slot in the die plate serve as guides for the punches, and the corresponding holes in the die plate below the slot are the actual die holes with which the punches cooperate in cutting the coding characters through the paper of the tickets. The upper portion of the die plate above the slot serves the function of not only guiding the punches, but it also acts as a stripper plate for the tickets as the tickets are withdrawn from the punches.

The holes with tapered entrances in the lower part of the die plate serve as guides for the punches of wheels 146 that are under the platen, and the corresponding holes in the upper portion of the die plate are the actual die holes for these lower punches. The lower portion of the die, below the slot through which the strip of tickets passes, serves as a stripper plate when the tickets are withdrawn from the lower punches, in the same way as the upper portion of the die serves as a stripper plate when the tickets are withdrawn from the upper punches.

Figures 2A, 5:
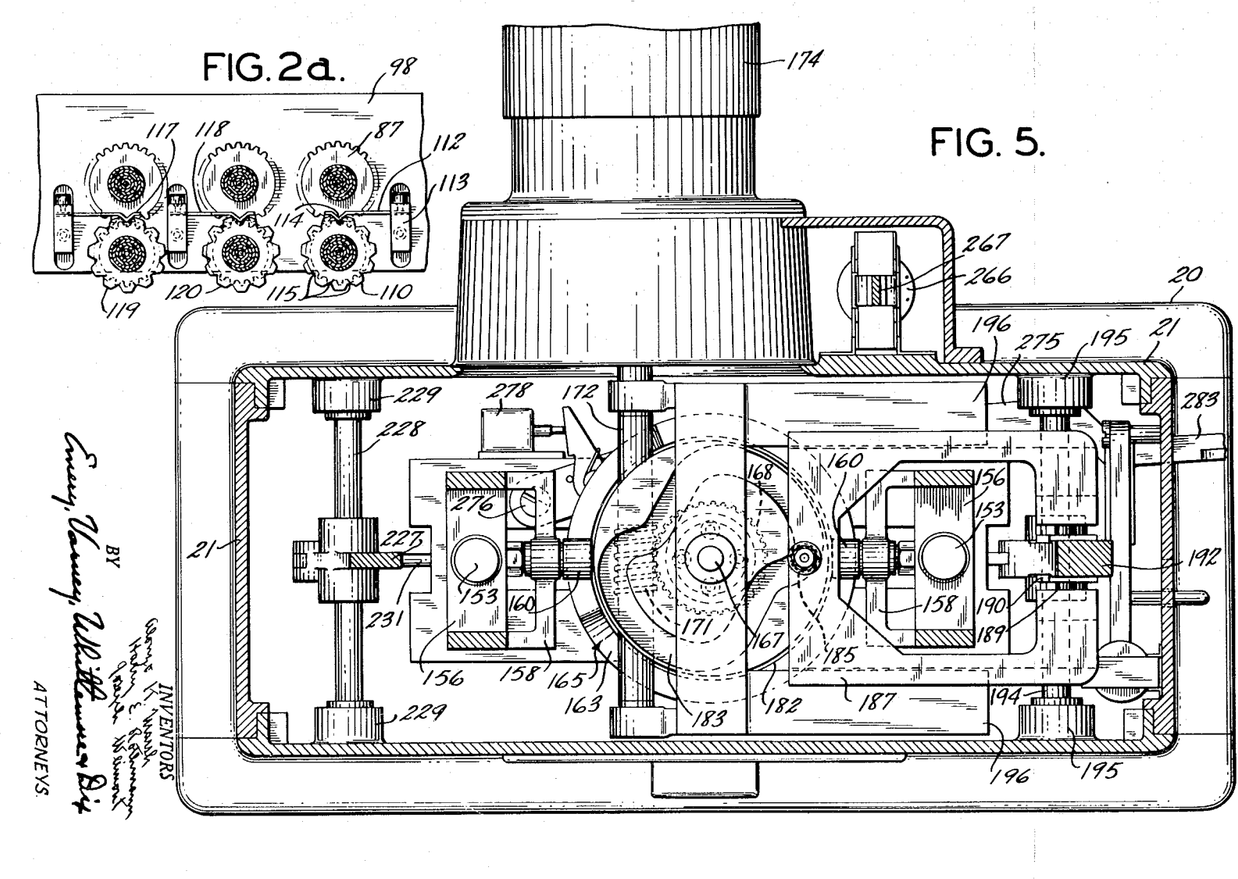
Fig. 2A is an enlarged sectional view taken on the line 2A—2A of Fig. 2.
Fig. 5 is a sectional view taken on the line 5—5 of Fig. 2, immediately below the lower printing and punching wheels, and showing a plan view of the cam and link mechanism, the latter partly in section, by which the shuttles or slides are reciprocated and showing also the cams that raise and lower the platen.
Figure 3:
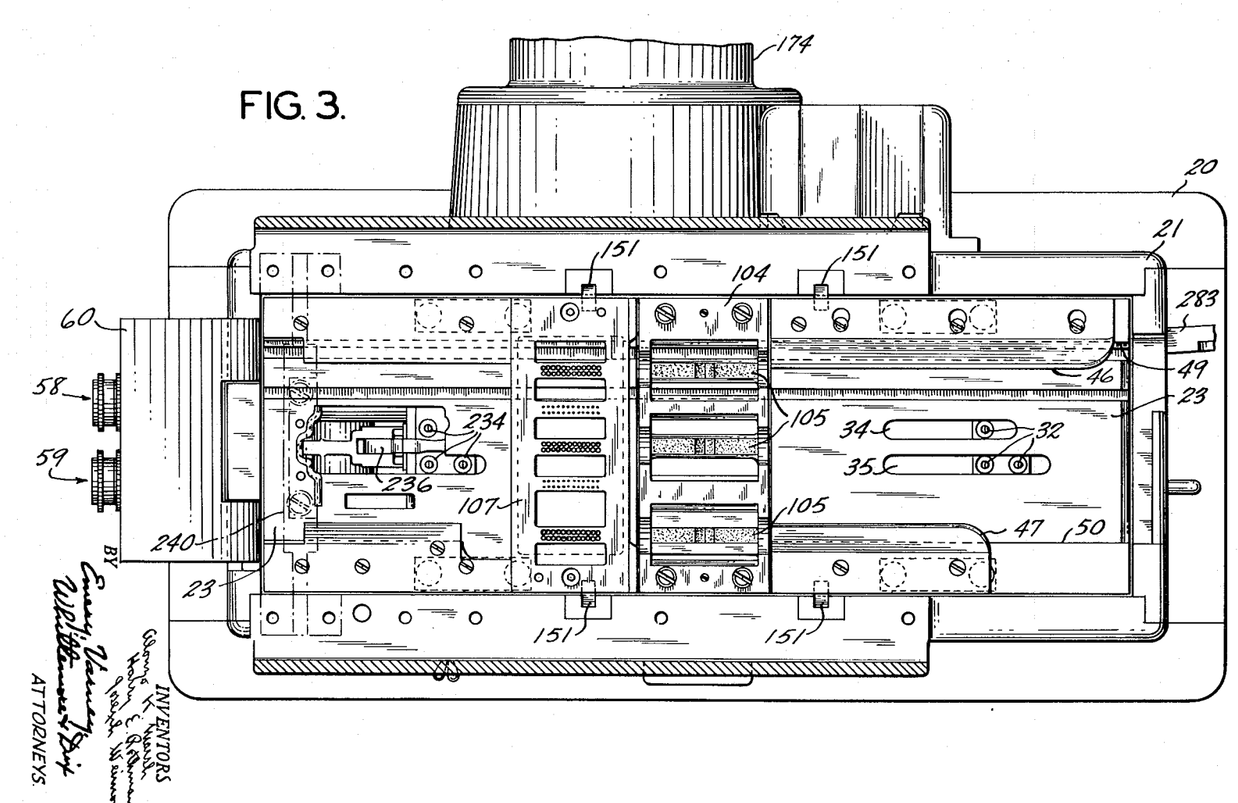
Fig. 3 is a sectional view taken along the line 3—3 of Fig. 2, immediately above the flat table or platen, and showing the printing and punching stations and the slots in the platen through which the feeding and locator pins project.

The mechanism for setting the printing and punching heads of the upper cage 98 includes resilient means for holding the printing and punching wheels in any set position. There are notched wheels 110 located adjacent to each of the gear wheels of the punch wheel group 89. The shape of each of these notched wheels 110 is best shown in Fig. 2A. There are springs 112 secured to a bracket 113 extending from a wall of the upper cage 98. One of these springs 112 extends over each of the notched wheels 110. Near the free end of each spring 112, the spring is shaped to provide a detent 114 which engages the notches 115 in the periphery of the adjacent wheel 110.

The detent 114 has sloping sides which cause it to shift the wheel 110 angularly as may be necessary to center the detent in the notch. Thus, if the corresponding punching wheel is adjusted to bring it almost into position for punching a coding character at the proper location, the detent 114 will engage part way into the nearest notch 115, and the pressure of the spring 112 causes the sloping faces of the detent 114 to rotate the detent wheel 110 one way or the other to accurately position the corresponding punching wheel. Similar springs 117 and 118 have detents engaging notched wheels 119 and 120 for accurately positioning the punch wheels that punch coding characters along the other lines of the ticket.

Figure 4:
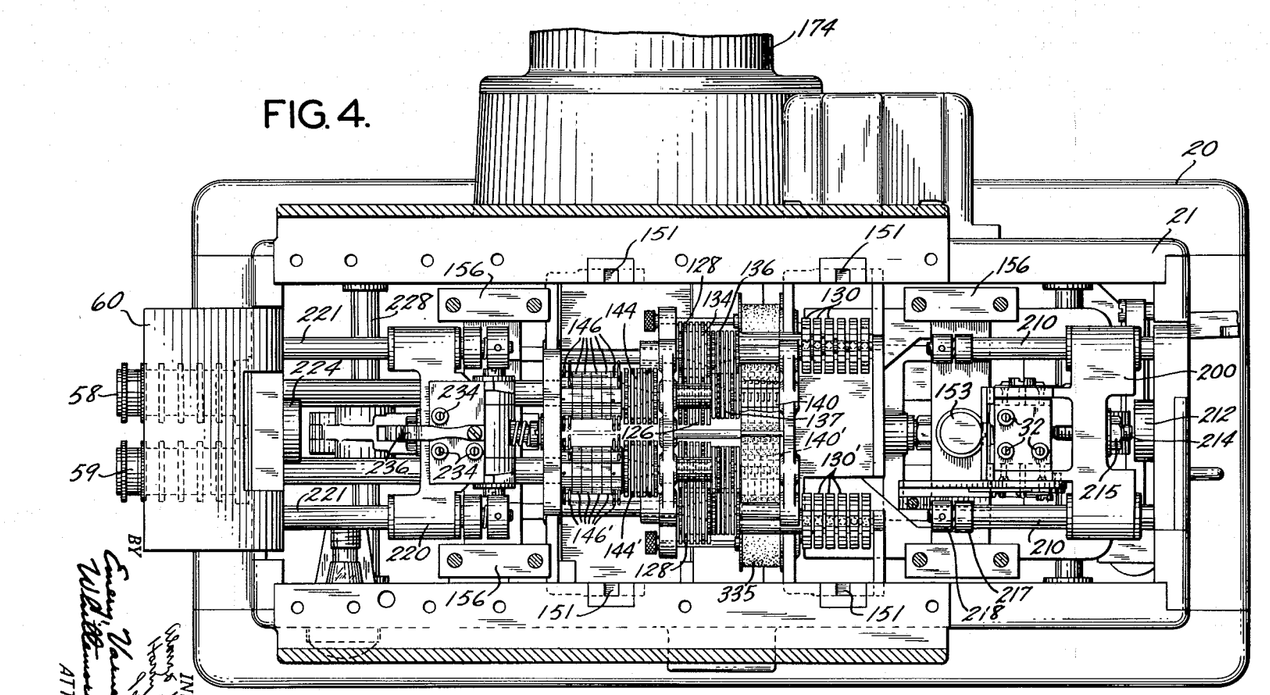
Fig. 4 is a sectional view taken on the line 4—4 of Fig. 2, immediately below the platen, and showing the lower printing and punching wheels and a plan view of the shuttles or slides that carry the feed and locator pins.
Figure 7:
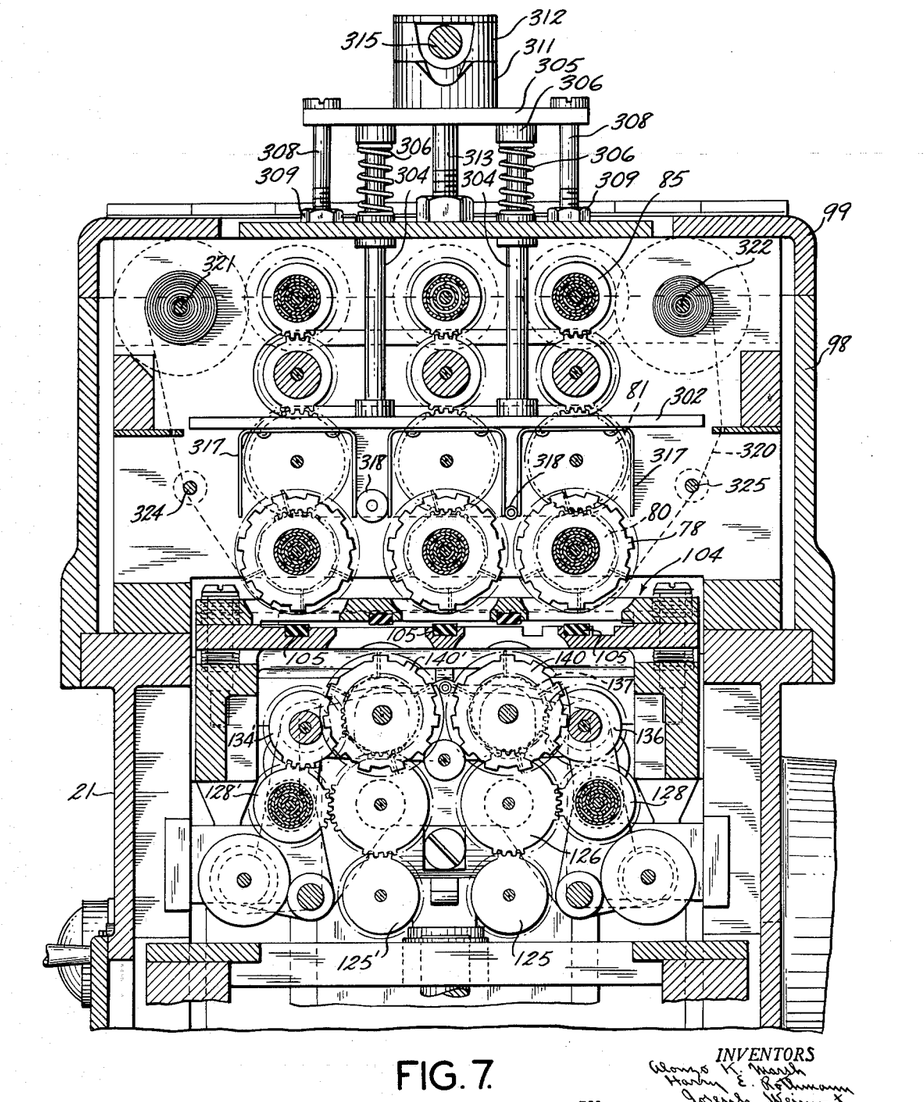
Fig. 7 is an enlarged, vertical, sectional view taken on the line 7—7 of Fig. 2.

Referring again to Fig. 2, the selector wheel group 58 is connected by quill shafts with driving gears of a gear group 125. This structure is supported by bearings in a frame that is rigidly secured to the lower portion of the housing 21, and that may be referred to as the "lower cage" of the machine. The driving gear group 125 meshes with gears of another intermediate group 126 located above it. The gears of this intermediate group 126 mesh with gears of a notched wheel driving gear group 128 located behind the gear group 126 in Fig. 2, and the location of which is best shown in Fig. 7. The wheels of this group 128 are connected by quill shafts to notched wheels 130 (Figs. 2 and 4). There are spring pressed detents 132 (Fig. 2) located under the notched wheels 130, and these spring pressed detents serve to accurately position the notched wheels 130 in the same way as the detents 114, described in connection with Fig. 2A, control the angular positions of the gearing and the printing and punching heads of the upper cage.

The gears of group 128 mesh with another gear group 134 (Fig. 4) located above them; and the gears of the group 134 are connected by quill shafts with gears of another transfer gear group 136 which mesh with gears of a printing wheel driving group 137 located in front of the gear group 136. The gears of the group 137 are connected by quill shafts with printing wheels 140.

The gears of the gear group 126 are connected by quill shafts to gears of another group 142 which mesh with gears of a punch wheel driving group 144. These gears of the group 144 are connected by quill shafts with punch wheels 146 that punch the second line of each ticket.

Referring again to Fig. 4 it will be understood that the selector wheels 59 control the setting of printing and punching wheels for the fourth line of each ticket, the gearing connections being similar to those already described for the selector wheels 58 except that transfer shafts are located ahead of, instead of behind, the axis of the selector wheel shaft in order to locate the printing heads closer together. The parts operated by the selector wheels 59 are indicated by the same reference characters as the parts operated by the selector wheels 58 except that a prime is appended to each reference character.

The gearing by which the punching wheels 146 are connected with the selector wheels 58 are arranged so that the selector wheels set the punch wheels in reverse order, that is, the right hand selector wheel sets the left hand punch wheel 146. This makes the sequence of coding characters that are punched through the bottom of each ticket have a reverse order to the numbers that are printed on the bottom; but the coding characters punched from the bottom are in the correct sequence when the ticket is viewed from the top. Also the coding characters themselves are oriented so that they should be read from the top, looking down. This feature makes it possible to use sensing equipment which treats all of the rows of punched coding characters in the same way.

The platen 23 has vertical flanges 151 (Fig. 4) that slide up and down in guide ways of the housing as the platen moves up and down during the operation of the machine. The platen is also guided, to prevent both longitudinal and transverse displacement, by posts 153 (Fig. 2) extending upwardly from the base of the machine and secured to the base by screws 154 or any other suitable fastening means.

There are brackets 156 extending downwardly from the platen 23, and these brackets 156 fit over the posts 153 and slide up and down on the posts. Each of these brackets 156 has a stirrup 158 (Fig. 5) which supports cam followers 160 and 161 (Fig. 2). The cam followers 160 are located above a rim 163 of a swash plate cam 165; and the cam followers 161 are located below the rim 163 of the cam. The cam 165 turns about a shaft 167 and is connected with a worm wheel 168 by screws 169. The work wheel 168 is driven by a worm 171 on a shaft 172 which is driven from a motor 174 (Fig. 5).

As the cam 165 rotates, it raises and lowers the stirrups 158, and the connected brackets 156 which raise and lower the platen 23 (Fig. 2). The contour of the rim 163 of the cam 165 is shaped so as to raise the platen and bring the strip of tickets up to the punching wheels 92 and the printing heads comprising the wheels 76 and 78. The upward movement of the platen is enough to cause the pins of the punching wheels 92 to punch holes completely through the tickets. Further rotation of the cam 165 causes the platen 23 to move downwardly and bring the strip of tickets against the line of punching wheels 146 and into contact with the printing head comprising the wheels 140.

As the cam 165 continues to rotate, it raises the platen 23 to an intermediate position which leaves the feed pins 32 extending through the feed holes in the ticket immediately over these pins 32. There are three feed pins 32, as shown in Fig. 1, but two of these pins 32 are ahead of the plane of section of Fig. 2.

Figure 11:
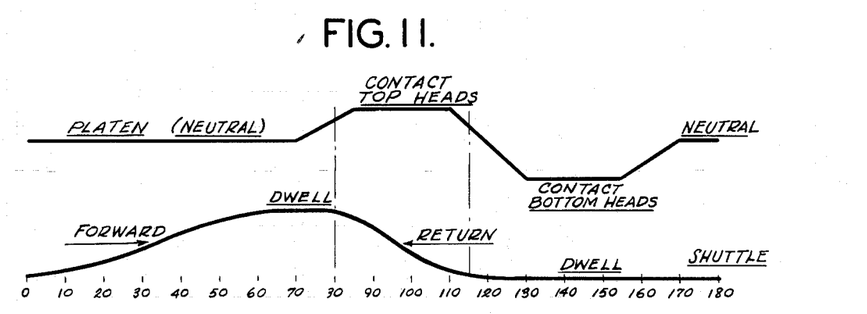
Fig. 11 is a cam displacement diagram.

In the preferred construction of the invention the feed pins 32 move forward and advance the strip of tickets while the platen 23 is in an intermediate position as illustrated in the cam displacement diagram shown in Fig. 11. This forward movement constitutes 65 degrees of the machine cycle. While the feed pins remain at the end of their stroke, and when the machine reaches the 70 degree point of the cycle, the cam 165 raises the platen into contact with the printing and punching heads of the upper cage. This upward movement takes about 15 degrees of the machine cycle and the platen dwells in contact with the heads of the upper cage for 25 degrees or until the 110 degree point in the cycle. While the platen is in this raised position, and during the first part of the downward movement of the platen, the feed pins 32 return to their original position, such return movement taking place between the 80 and 115 degree points of the cycle.

The cam 165 moves the platen downward during 20 degrees of the cycle and into contact with the printing and punching heads of the bottom cage where the platen dwells from the 130 to the 155 degree point of the cycle. The cam 165 then raises the platen, through 15 degrees of the cycle, to its neutral position where it remains until the cycle is completed. The feed pins remain stationary at the starting end of their stroke from the 115 degree point of the cycle until the cycle is completed. The machine operates through two complete cycles for each complete revolution of the cam 165.

There is another cam 182 on the shaft 167 and this cam 182 has a groove 183 that receives a cam follower 185. The cam follower extends downwardly from a yoke 187 that is connected at its other end to a shaft 189 extending through a slide block 190 in a slot 191 of a lever 192. The lever 192 rocks about a fulcrum shaft 194 supported by bearings 195 from the housing. Rails 196 fixed to the housing support the yoke 187.

The upper end of the lever 192 is connected by a link 198 to a shuttle feed slide 200. This connection between link 198 and the slide 200 is provided with shock absorber springs 202 on opposite sides of a cross element 204 to which the link 198 is connected by a shoulder screw 206.

The slide 200 reciprocates on horizontal posts or studs 210 extending inwardly from the end wall of the housing 21. There is a spring bumper 212 connected to the end wall of the housing. An adjustable abutment comprising a screw 214 on the slide 200 can be regulated so as to strike the bumper 212 near the end of the stroke of the slide 200. A lock nut 215 holds the screw 214 in adjusted position. There are other bumpers at the inner ends of the studs 210. Each of these other bumpers comprises a collar 217 movable along the stud 210 and held away from an end stop 218 by a coil spring that extends around the stud 210. The pins 32 extend upward from the shuttle or slide 200 and they are rigidly connected with the slide so that they reciprocate as a unit with the slide.

There is another slide 220 near the discharge end of the machine. This slide 220 reciprocates on studs 221 extending from the end wall of the machine and it has an adjustable abutment 223 that comes against a bumper 224 at one end of the stroke. The abutments on the slides 200 and 220 are adjusted so that they strike against the bumpers at the ends of their strokes, and this adjustment determines accurately the length of the stroke in order to feed the ticket strip for a distance equal to exactly one ticket width. It is not necessary to have the connecting links between the levers 192 and 227 move for the exact width of one ticket because the connection between these links and the shuttle or slides 200 and 220 provides for a limited amount of overtravel for the links, the springs 202 being compressed during the overtravel.

The slide 220 is connected with a link 227 by a shock absorbing link connection similar to the connection between the lever 192 and the slide 200, already described. The lever 227 rocks on a shaft 228 supported in bearings 229 from the housing 21. This lever 227 is rocked in the housing, with the lever 192, by a tie rod 231 which connects the lower ends of the levers 192 and 227. The effective length of this tie rod 231 is adjustable by threading it further into or out of yokes 232 which provide the actual connections between the tie rod and the levers, and the length of this tie rod is adjusted so that when the pins 32 are in engagement with the feed openings in the ticket strip, corresponding draw pins 234, carried by the slide 220 engage the feed openings of another ticket of the same strip.

The reason for having two groups of feed pins 32 and 234 is to feed the strip forward when only a part of the strip is located on the platen, for example, in the initial operation on a strip, the first ticket is pushed along the platen manually far enough to be engaged by the feed pins 32. As the machine operates, these feed pins 32 advance the strip with a step by step movement, one ticket width at a time, until the first ticket reaches the second group of feed pins, herein referred to as draw pins 234.

The machine continues to operate with both the feed pins 32 and draw pins 234 advancing the strip until the last ticket of the strip has passed beyond the feed pins 32. Continued advancing of the strip then depends entirely upon reciprocating movement of the draw pins 234. In the machine illustrated, the draw pins 234 are not near enough to the end of the platen to discharge the last ticket of the strip. The slide 220 is equipped with a spring 236 that extends upward through the platen just beyond the draw pins 234 for ejecting the last ticket of a strip from the platen after the draw pins 234 have advanced the strip as far as possible and then come back to their starting position. On the next stroke of the slide 220, the last ticket ejector 236 engages the rearward edge of the ticket and pushes it from the platen to the chute 60 from which the ticket drops into a container with the other tickets.

Near the discharge end of the platen 23 there is a cut-off bridge 240 supported from the frame of the machine. A stripper plate 242 is held down against the strip of tickets on the platen by coil springs 243 pressed between the bridge 240 and the stripper plate 242. There are two punches 244 secured to the bridge 240 and extending through holes in the stripper plate 242. These punches 244 are located above the lands 44 (Fig. 9) of the ticket strip and the punches are large enough to completely punch out the lands 44 when the platen 23 rises and brings the ticket strip up against the punches. The holes punched by these punches 244 are indicated by the reference character 244 in Fig. 9, and it is evident that they completely sever the endmost ticket from the remainder of the strip.

Referring again to Fig. 2, there is another cut-off bridge 250 located near the supply end of the platen 23 and provided with a stripper plate 252, springs 253, and punches 254. This cut-off bridge 250 is ordinarily held in a raised and inoperative position by springs 256 (Fig. 8) which urge the bridge 250 upward along guide pins 257 and into contact with stop collars 258 at the upper ends of the guide pins 257.

The cut-off bridge 250 is moved downward into operative position by a pin 260 extending from a lever 262 and across the top surface of the cut-off bridge. This lever 262 swings about a pivot 264 on a fixed part of the frame of the machine. The lever 262 is ordinarily held in its upward position by the pressure of the cut-off bridge 250 against the pin 260. The lever 262 is pulled downward, to bring the cut-off bridge 250 into operative position, by a solenoid 266 having a plunger 267 connected to the lever 262 by a link 268.

The solenoid 266 is energized by a switch in a counter 270 (Figs. 1 and 2). This counter is actuated by a push rod 271 which is slidable up and down in a bearing attached to the side of the upper cage 98. This push rod 271 actuates a lever 272 which rocks on a fixed shaft 273 extending from the cage 98. This rocking movement of the lever 272 is transmitted to the counter 270 through a pin and slot connection so that the counter moves one unit every time that the push rod 271 is lifted by the platen 23. A spring holds the push rod 271 in contact with the platen so that it will rise and fall as a unit with the platen. The counter is originally set for the number of tickets which are to be marked and punched; and when this number has reached the counter it closes a switch. Such counters are well known in the art.

Figure 6:
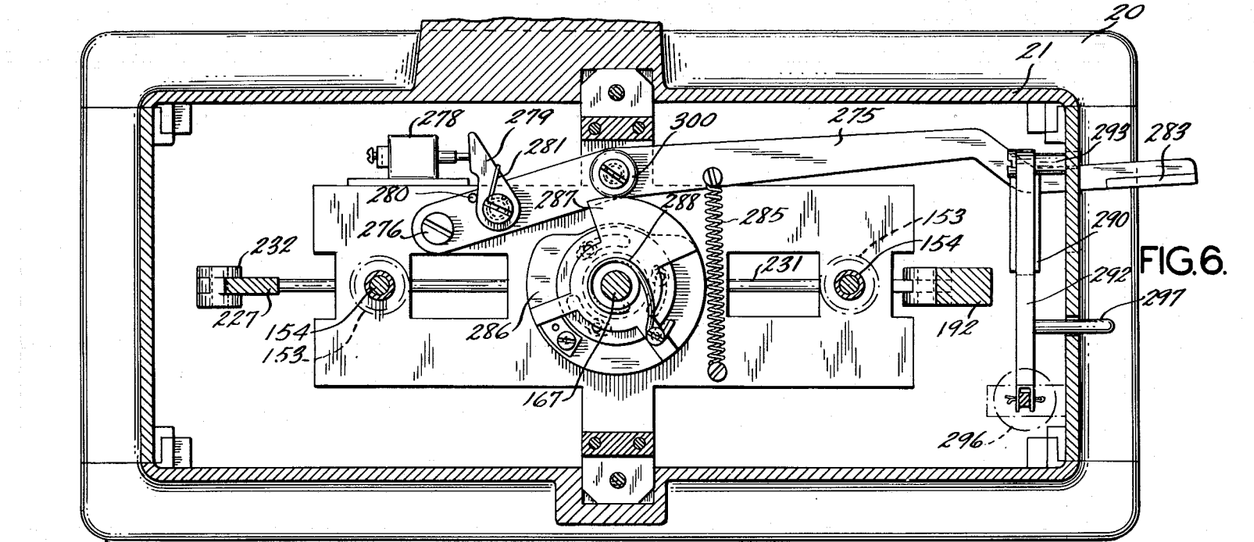
Fig. 6 is a sectional view taken on the line 6—6 of Fig. 2, this section being taken just above the base of the apparatus and showing the starting lever and mechanism for controlling the starting and stopping of the machine with relation to the positions of various parts of the mechanism in their cycle of operation.

Fig. 6 shows a starting lever 275 which is connected to the base of the machine by a pivot 276. This starting lever actuates an electric switch 278 to supply power to the motor of the machine whenever the starting lever 275 is in its rearward position, as shown in Fig. 6. In order to provide some resilience between the starting lever 275 and the switch 278, there is an actuator 279 pivoted to the starting lever and held against a pin 280 by a spring 281. This actuator 279 ordinarily moves as a unit with the starting lever 275, but it can move against the pressure of the spring 281 in the event that the switch 278 has moved as far as possible before the starting lever 275 reaches the end of its stroke.

The starting lever 275 has a handle 283 at one end extending through a slot in the housing of the machine. The operator of the machine pushes the handle 283 rearwardly, that is, toward the top of Fig. 6, against the tension of a spring 285. When the parts of the machine are in certain positions, during the cycle of operation of the machine, the starting lever 275 is prevented from moving forwardly by a cam 286 secured to the shaft 167 as will be more fully explained.

The cam 286 is made in two parts, one of which is rigidly secured to the shaft 167 and the other of which is angularly movable on the shaft. The movable part of the cam is indicated by the reference character 287, and it provides a radial shoulder at one end of the low part of the cam 286.

When the lever 275 is pushed rearwardly into position to start the machine, it is held in such position by a latch 290 (Fig. 8) connected to the starting lever and extending forwardly from the lever. This latch 290 engages behind a shoulder 291 of a lever 292 which swings about a pivot 293. The lever 292 is urged downward at all times by a spring 294. The latching lever 292 can be raised automatically by a solenoid 296, or it can be raised manually by a manually-operated lifting pin 297, best shown in Fig. 6. The solenoid 296 is energized by a switch 356 (Fig. 2) located near the discharge end of the platen and having contacts that are held apart by the tickets as long as there is a ticket on the platen between them.

When the machine is in operation, the shaft 167 and the cam 286 rotate in a counterclockwise direction, as viewed in Fig. 6. Whenever the low part of the cam 286 passes under the cam follower 300, during a time when the starting lever 275 is not latched in operating position, the lever 275 moves toward the axis of the cam and opens the switch 278. However, the momentum of the motor and other parts of the machine causes the machine to coast, and this continued movement rotates the shaft 167 and brings the shoulder of the angularly movable portion 287 of the cam into contact with the cam follower 300.

The spring 288 opposes angular movement of the cam portion 287 with respect to the shaft 167, and the force of this spring therefore serves as a brake to oppose further rotation of the shaft 167 after the portion 287 of the cam has come against the cam follower 300. Further coasting of the machine is thus prevented and in this way the machine is stopped at the end of the cycle in position to begin a new cycle when it is started for marking a new run of tickets.

One refinement of the illustrated machine, which makes it possible to use gearing that has considerable back lash, is shown in Fig. 7. A plate 302 extends across the top of the printing wheels 78 and all of the other printing wheels of the top cage. This plate is connected to the lower ends of push rods 304 which extend through the cover of the machine. The push rods 304 are connected at their upper ends to a top plate 305 and the entire assembly is urged upward by springs 306 surrounding the push rods 304 and compressed between the push rods 304 and the top of the housing of the machine.

The plate 305 slides up and down along guide screws 308 threaded into the top of the housing and secured in position by lock nuts 309. A cam follower 311 is connected to the top of the plate 305 immediately below a cam 312 which rotates on a stud 313 extending upward through the plate 305 and through the cam follower 311. When the cam 312 is rotated from the position shown in Fig. 7 by a handle 315, and about the axis of the stud 313, the cam displaces the follower 311 downward and pushes the rods 304 and plate 302 downward toward the printing wheels 78 and the other printing wheels of the upper cage.

The printing wheels are constructed so that there is a projection on the periphery of each wheel for each of the type numerals. There are inverted, U-shaped brackets 317 secured to the underside of the plate 302, and the downwardly extending sides of these U-shaped brackets are spaced so that they contact the sides of the type carrying projections on opposite sides of the printing wheels. The brackets 317 are guided and maintained in positions parallel to the axes of the printing heads by guide rollers 318.

The printing wheels are designed so that when one of the projections is at the bottom of the wheel, and in the correct position for printing, the sides of two other projections, on opposite sides of the printing wheel, are at the same level and in position to be contacted simultaneously by the lower ends of the downwardly extending sides of the U-shaped brackets 317.

When these brackets 317 come into contact with the printing wheels, therefore, and either of the projections with which the brackets are to contact is at a higher level than the other, the bracket 317 strikes the higher projection first and turns the printing wheel until both projections are at the same level. The bracket 317 above the printing wheels 78 is long enough to span all of the printing wheels 78. The other brackets 317 are also long enough to contact simultaneously with all of the printing wheels of the printing heads below them. In this way all of the type figures of each row of printing wheels are maintained in position to print an even row of figures, even though the selector wheels do not accurately position the printing wheels because of back lash in the gearing.

The brackets 317 not only maintain the type figures in line, but they also serve to obtain substantially equal pressure against the surface of the ticket for all of the type wheels in each row. This result is obtained because the bracket 317, by extending across all of the type wheels of a row, holds the wheels at the same level and rigidly in place as the platen rises and presses the surface of the ticket against the type wheels. This feature is particularly important in the machine of this invention because of the fact that the type wheels are carried by quill shafts. It is, of course, necessary to have a running clearance between all of the quill shafts and this running clearance is cumulative so that the wheel at one end of the row has a certain amount of radial play that the wheel at the other end of the row does not have, this latter wheel being on a solid shaft. If the quill shafts were the only means for holding the top wheels in place while printing, the pressure would not be equal along the entire row of figures. With the brackets 317 holding the type wheels at the same level, equal pressure is obtained even with quill shafting.

In the illustrated machine, the printing heads have ribbons that are operated in a manner similar to typewriter ribbons. Fig. 7 shows one of the ribbons 320 for printing heads of the upper cage. This ribbon 320 wraps around spools on shafts 321 and 322 on opposite sides of the machine and passes around guides 324 and 325 which lead the ribbon to and from the endmost printing heads at an advantageous angle. At the outer ends of the shafts 321 and 322 there are helical gears 326 and 327 (Fig. 8) and these wheels are rotated by helical gears 326' and 327' on a composite telescoping shaft 328. When the shaft 328 is shifted in one direction it drives the helical gear 326' and when shifted axially in the other direction it drives the helical gear 327'. Power to this shaft is supplied by a pawl and ratchet mechanism operated from the feed shuttle yoke, but not illustrated since it is not necessary for a complete understanding of the invention.

There is a ribbon 335 (Fig. 4) for the printing wheels of the lower cage. This ribbon is carried on spools on opposite sides of the machine and these spools are rotated intermittently and successively to wind the ribbon from one spool to another and back again by mechanism similar to that used for the ribbon of the upper printing wheels.

Figure 12:
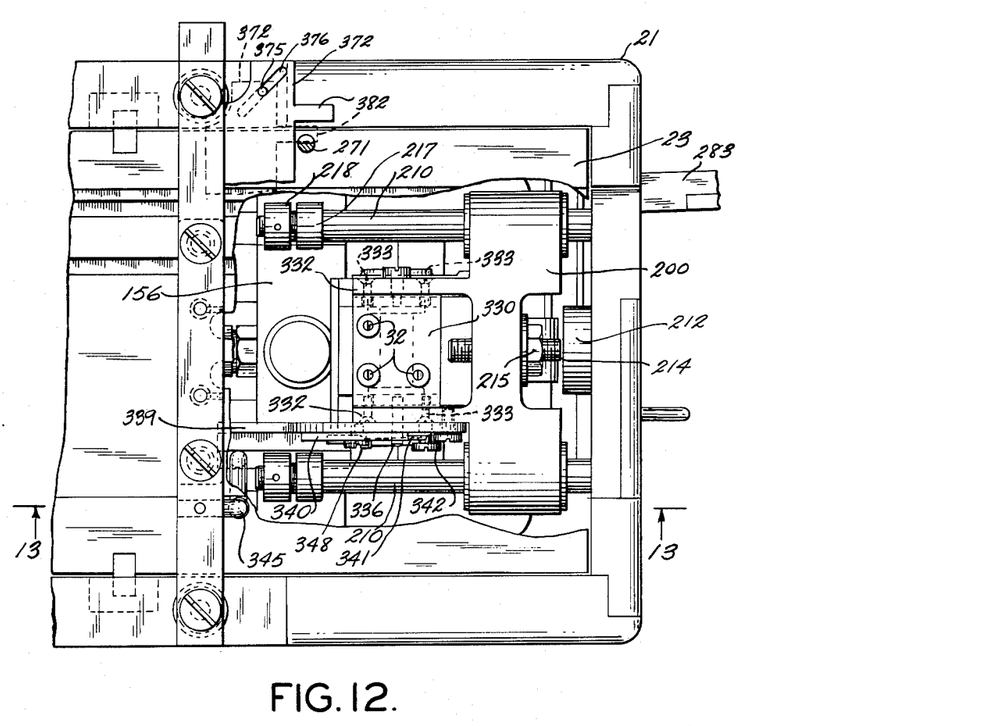
Fig. 12 is a top plan, detail view of the shuttle or slide at the supply end of the platen, and this figure shows the mechanism that lowers the feed and locator pins to stop the supply of additional strips after the cut-off bridge has operated and while the preceding portion of the ticket strip completes its passage through the machine.
Figure 14:
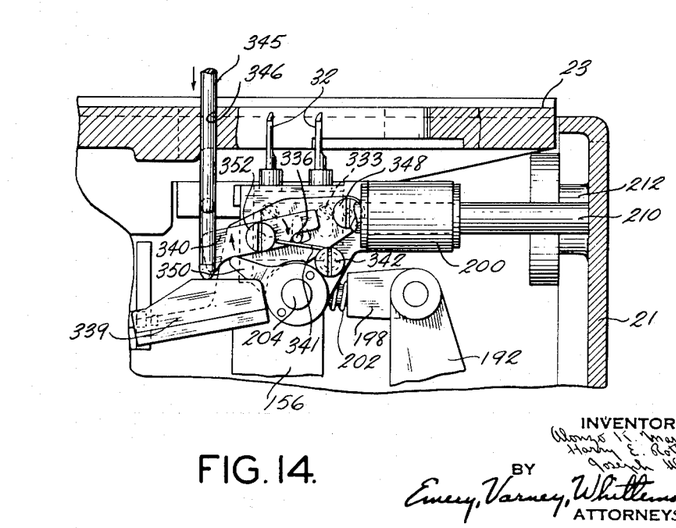
Fig. 14 is a view similar to Fig. 13, but showing the apparatus in other positions.

Figs. 12 and 14 show the detail construction of the support by which the feed pins 32 are carried. This support is made in such a way that the feed pins 32 are moved downward into an inoperative position whenever the cut-off bridge 250 is operated. Thus, the further feeding of the strip beyond the cut-off bridge 250 is stopped while the machine continues to operate and complete the marking and punching of the remaining unfinished tickets that had already passed the cut-off bridge before it severed the ticket strip.

The feed pins are carried by a platform 330 which is a part of the shuttle feed slide 200. This platform 330 is confined between side elements 332 of the feed slide. Guide screws 333 are threaded into the side elements 332 and have inwardly extending ends which project into slots 334 in downwardly extending sides of the platform 330.

The platform 330 slides up and down on the screws 333 within the limits imposed by the length of the slots 334. A pin 336 extends from one side of the platform 330 through a slot in the adjacent side element 332 and through another slot 338 of a cam plate 339. The pin 336 extends further under a rocker arm 340 and across the upper end of a spring 341. This spring 341 is secured to the shuttle feed slide 200 by a screw 342, and the tension of the springs 341 urges the pin 336 upward so that the platform 330, which carries the pins 332, is normally in a raised position with the guide screws 333 against the upper ends of the slots 334.

A push rod 345, rigidly connected with the cut-off bridge 250, extends downwardly through an opening 346 in the platen 23. The lower end of this push rod 345 is located over a portion of the cam plate 339. When the cut-off bridge 250 is moved downward to sever the strip of tickets, in the manner previously explained, the push rod 345 causes the cam plate 339 to rock counterclockwise about a pivot screw 348 that connects the cam plate 339 to the shuttle feed slide 200.

Figure 13:
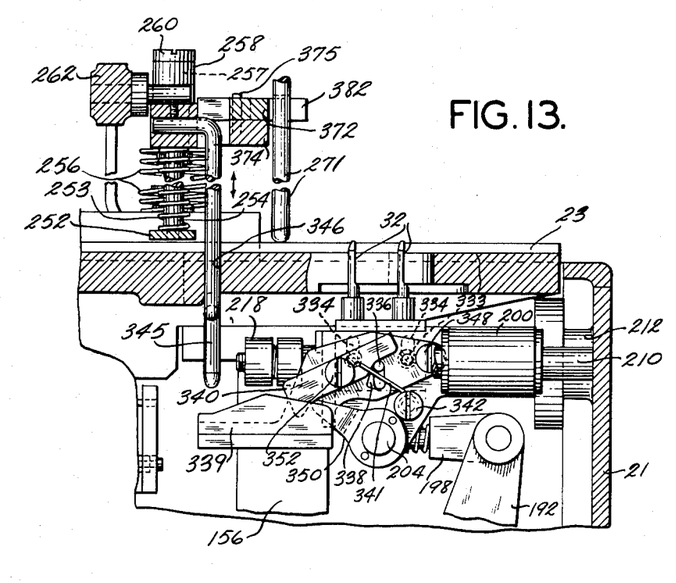
Fig. 13 is a sectional view on the line 13—13 of Fig. 12 and showing an elevation of a portion of the structure illustrated in Fig. 12.

The cam plate 339 is normally held in the position shown in Fig. 13 by the pin 336 which contacts with the upper end of the slot 338. When the cam plate 339 is moved downwardly by the push rod 345, the end of the slot 338 pulls the pin 336 downwardly and moves the platform 330 downwardly as a unit with the pin 336. This movement is against the tension of the spring 341.

In order to obtain an increase in the downward movement of the platform 330 and the pins 32 which are carried by the platform, there is a finger 350 extending outward from the cross element 204 and contacting with one end of the rocker arm 340. This rocker arm 340 is supported by a fulcrum stud 352 which extends from the side of the cam plate 339; but the end of the rocker arm 340, that is in contact with the finger 350, is held against downward movement by the finger. As the cam plate 339 rocks downwardly about its pivot 348, therefore, the rocker arm 340 is forced to move angularly in a clockwise direction about its fulcrum pivot 352 into the position shown in Fig. 14. This movement of the rocker arm 340 forces the pin 336 downwardly and depresses the platform 330 far enough to bring the feed pins 332 below the level of the top surface of the platen.

Reciprocating movement of the shuttle feed slide 200 while the pins 32 are in this lowered position has no effect upon the ticket strip remaining on the platen above the feed pins 32.

Figure 8:
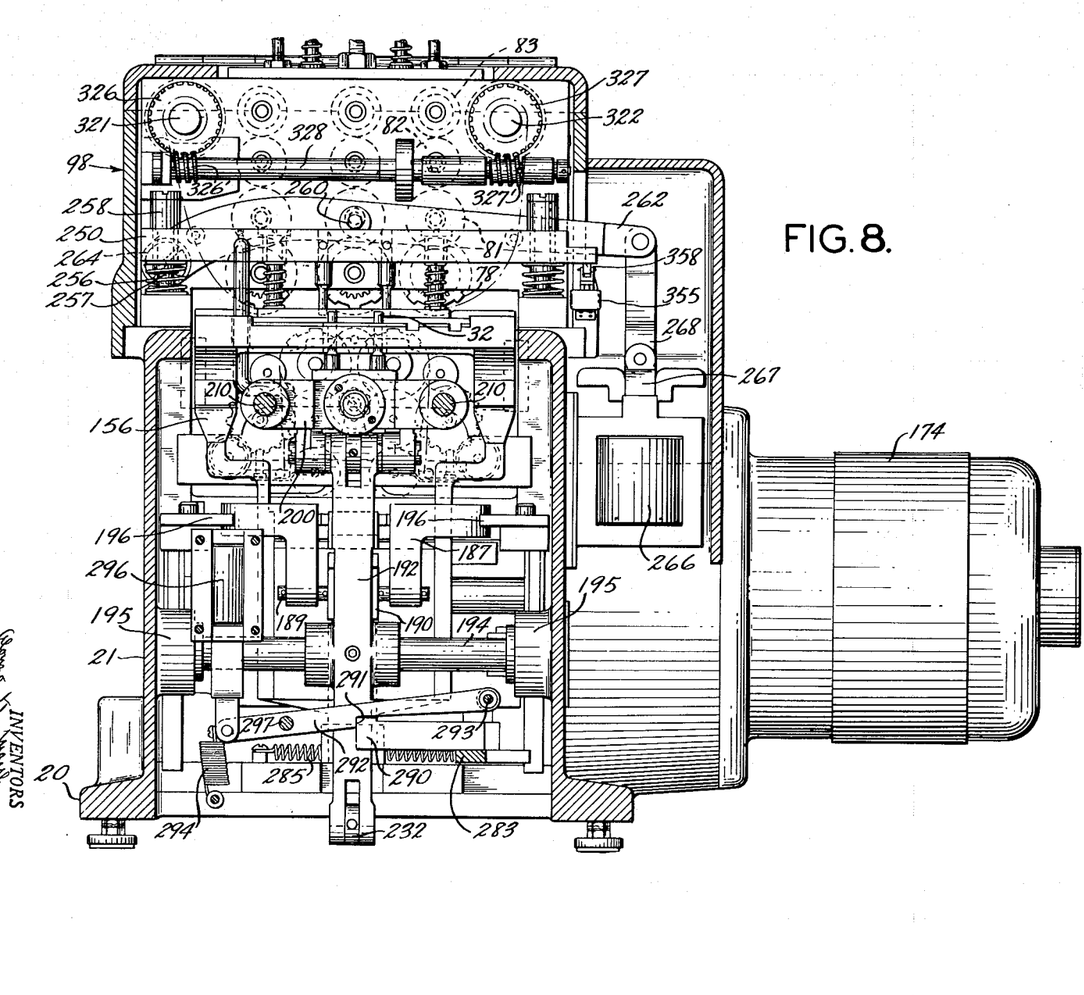
Fig. 8 is a slightly enlarged, vertical, sectional view taken on the offset line 8—8 of Fig. 2.
Figure 15:
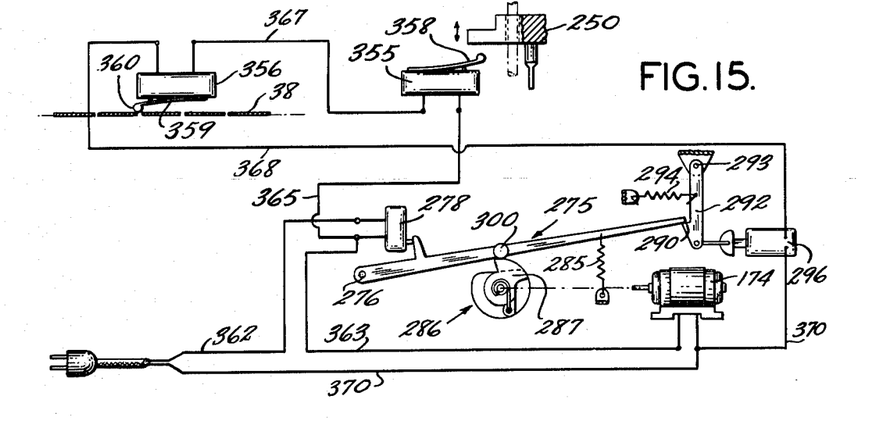
Fig. 15 is a wiring diagram showing the control mechanism for continuing the operation of the feeder after the cut-off bridge has severed the strip of tickets.
Figure 16:
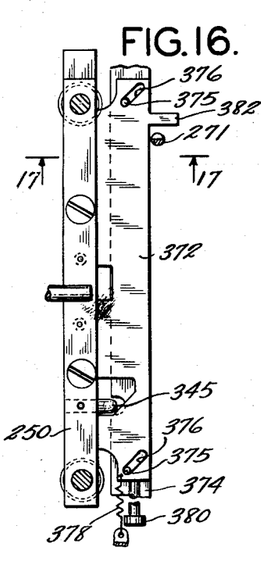
Fig. 16 is a fragmentary top plan view showing the mechanism for holding the cut-off bridge down.

Fig. 15 shows control mechanism for causing the feed pins of the machine to continue operating after the first cut-off bridge has severed the strip of tickets and until all of the tickets beyond the cut-off bridge have completed their passage through the machine. This control is obtained by two limit switches at 355 and 356. The limit switch 355 has a bias toward open position and it is located in a position near one end of the cut-off bridge 250 and under an extension of the bridge, as shown in Fig 8.

There is an arm 358 on the switch 355, and this arm has a roller at one end located under the extension of the bridge so that whenever the bridge moves downwardly, to sever the ticket strip, the arm 358 closes the switch 355. This switch remains closed as long as the cut-off bridge 250 is held down, and the switch 355 opens again whenever the cut-off bridge 250 rises.

The control switch 356 is located near the discharge end of the machine and immediately over the platen, as shown in Fig. 2. This control switch 356 has a bias toward closed position and has an arm 359 with a roller 360 at the lower end of the arm. The roller 360 contacts with the top surface of the tickets on the platen and is supported by the tickets to hold the switch 356 open. Whenever there is no ticket on the platen under the switch 356, the roller 360 drops downward through an opening in the platen, and the resulting movement of the arm 359 permits the switch 356 to close. The arm 359 is so correlated with the contacts within the switch 356 that the switch is not closed by downward movement of the platen, but only by the greater movement permitted to the roller 360 when there is no ticket on the platen to support the roller.

The control circuits for the machine are shown in Fig. 15. One side of a power line is connected by a conductor 362 with a switch 278. When this switch is closed, it supplies power to the motor 174 through a conductor 363, and also supplies power, through a conductor 365, to the control switch 355.

During normal operation of the machine, the switch 355 is open and no power is supplied to a conductor 367, which connects the control switches 355 and 356 in series. These control switches are also connected in series, by conductor 368, with the solenoid 296 that operates the latch lever 292. Both the motor 174 and the solenoid 296 are connected to the other side of the power line by conductors 370.

When a predetermined number of tickets have passed the cut-off bridge 250, the number being determined by the operation of the counter, the cut-off bridge 250, is operated to sever the strip of tickets, in the manner already explained. This operation of the cut-off bridge moves the arm 358 of the control switch 355 in a direction to close this control switch 355; but the circuit through the control switches 355 and 356 remains open at the switch 356 until the feed mechanism of the machine has operated for a sufficient period to advance all of the tickets, that were beyond the cut-off bridge 250, past the control switch 356.

When the last ticket has passed the control switch 356, the roller 360 is no longer supported, and it drops into the opening in the platen permitting the switch 356 to close so that power is supplied to the latch solenoid 296. The energizing of this solenoid 296 pulls the latch bar 292 away from the starting lever 275. If the parts of the machine are near the end of a cycle of operation, the lever 275 moves downward, and the starting switch 278 opens. If the parts of the machine are not near the end of a cycle of operation, the cam 286 holds the starting lever 275 in position to maintain the switch 278 closed until the cam 286 has rotated far enough to bring the low portion of the cam under the cam follower 300. This position of the cam 286 corresponds with an end of a cycle of the machine.

Figure 17:
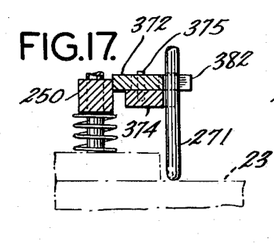
Fig. 17 is a sectional view taken on the line 17—17 of Fig. 16.
Figure 18:
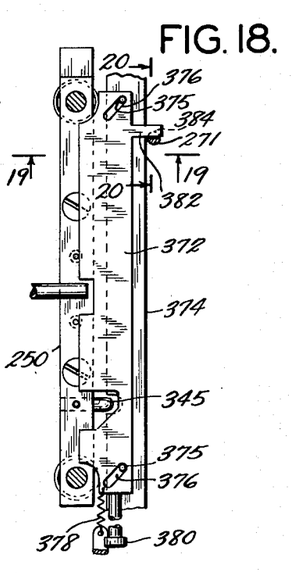
Fig. 18 is a view similar to Fig. 16, but showing the parts in the positions that they occupy after the cut-off bridge has been operated.
Figure 19:
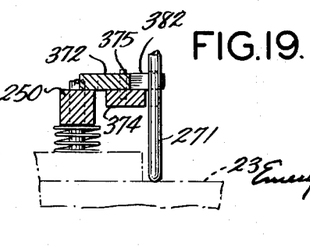
Fig. 19 is a sectional view taken on the line 19—19 of Fig. 18.

Figs. 16–19 are detail views showing the structure for holding the cut-off bridge 250 down after it has been operated. A plate 372 rests on a frame element 374 which constitutes a rigid part of the housing of the machine. Pins 375 extend upward from the plate 374 and through slots 376 in the plate 372 and these pins have heads that prevent upward movement of the plate 372 away from its supporting frame element 374. A spring 378 is tensioned between the plate 372 and a fixed part of the machine frame. This urges the plate 372 toward the cut-off bridge 250 along a line of movement controlled by the direction in which the slots 376 extend. During the normal operation of the machine, the plate 372 is held against the front surface of the cut-off bridge 250, as shown in Fig. 17.

Whenever the cut-off bridge 250 moves downward below the bottom surface of the plate 372, the spring 378 pulls the plate 372 to the end of the slots 376 so that a portion of the plate 372 extends across the top of the cut-off bridge 250 and prevents the cut-off bridge from moving upward again. When the machine is to be put into operation for another group of tickets, a push button 380 is operated manually to return the plate 372 to its inoperative position; and when this plate is pushed back into the position that it occupies in Fig. 16, the cut-off bridge 250 is free to spring back to its raised position. In this raised position the cut-off bridge prevents the plate 372 from moving inward until the cut-off bridge is depressed again, after the counter of the machine has counted off the necessary tickets of the next run of the machine.

Figure 20:
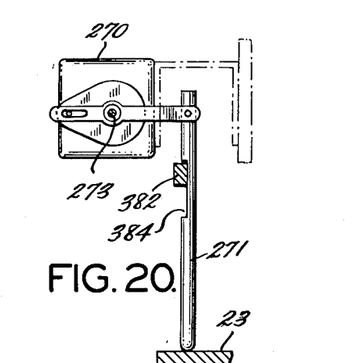
Fig. 20 is an enlarged view on line 20—20.

There is a tail 382 extending from one end of the plate 372 in position to engage in a notch 384 of the counter push rod 271. This construction is best shown in Fig. 20. The notch 384 is long enough to permit a limited movement of the rod 271 since the rod must move upward with the platen, but the tail 382 prevents the counter operating rod 271 from following the platen downward below its neutral position and this limitation in the stroke of the operating rod 271 prevents the counter 270 from being operated after the cut-off bridge 250 has moved downward and the plate 372 has moved inward over the cut-off bridge. This construction stops the operation of the counter as soon as the counter has counted off the predetermined number of tickets for which it was set and has energized the solenoid which pulls the cut-off bridge 250 down to sever the ticket strip.

The preferred embodiment of the invention has been illustrated and described, but changes and modifications can be made, and some features can be used alone or in different combinations, without departing from the invention as defined in the claims.

What is claimed is:

1. A machine for printing and punching individual marking tickets of a strip of tickets, comprising a platen along which the strip of tickets is advanced, feeding means engaging said strip at a plurality of positions along the platen and operating in unison through strokes of equal amplitude to advance the strip along the platen with a step by step movement, said feeding means being spaced to encompass a plurality of tickets of the strip, a cutoff device located near the supply end of the platen, means including a counter to operate said cutoff device to sever the strip after a predetermined number of tickets have passed said cutoff device, one of said feeding means engaging said strip near said cutoff device to feed the strip toward the platen, and means to render said feeding means which is near said cutoff device inoperative to feed the unsevered portion of the strip after said cutoff device has been operated while the said other feeding means continues to feed the severed portion of the strip along the platen with a step by step movement.

2. A machine for printing and punching individual marking tickets of a strip of tickets, comprising a platen along which the strip of tickets is advanced, means to feed the strip along said platen with a step by step movement, said strip feeding means including members to engage the ticket strip near one end of the platen and second members spaced from said first members to encompass a plurality of tickets of the strip to engage the ticket strip near the other end of the platen, said members operating in unison through strokes of equal amplitude, a cutoff device located at a region of the platen between said first and second members, means including a counter to operate said cutoff device to sever the strip after a predetermined number of tickets have passed said cutoff device, and means to render said first members inoperative to feed the strip after said cutoff device has severed the strip and while said second members continue to feed the severed portion of the strip with a step by step movement.

3. A machine for printing and punching marking tickets, comprising a platen along which a strip of tickets is advanced with a step by step movement, a printing station at which printed characters are applied to each ticket of the strip, a punching station at which punched characters are applied to each ticket of the strip, means to feed said strip of tickets to said stations, a second ticket feeding means to feed said strip of tickets away from said stations, said feeding means being spaced to encompass a plurality of tickets of the strip, a counter operated during each machine cycle to count the number of tickets fed to said stations, a cutoff device located in advance of said stations, and means controlled by said counter to simultaneously operate said cutoff device to sever said web and to render said first ticket feeding means inoperative to feed tickets to said stations after a predetermined number of operations of said counter and while said second ticket feeding means continues to feed tickets away from said stations.

4. A machine as claimed in claim 3, including a second cutoff device located beyond said printing and punching stations, and means to operate said second cutoff device to sever individual tickets from the strip.

5. A machine for printing and punching marking tickets comprising a platen along which a strip of connected tickets are advanced through the machine, means for feeding the strip intermittently along the platen with a step by step movement, a settable counter, a cutoff device near the supply end of the platen, means controlled by said counter to operate said cutoff device to sever the strip after a number of tickets determined by the setting of said counter have passed the cutoff device, ticket marking means located along the platen beyond the cutoff device, means to operate said ticket marking means to mark successive tickets between successive operations of said feeding means, a second cutoff device at the discharge end of the platen beyond the marking means, and means to operate said second cutoff device between successive operations of said feeding means to sever individual tickets from the strip, said feeding means, said marking means and said second cutoff device continuing to operate on the tickets of the severed portion of the strip after it has been severed by said first cutoff device.

References Cited in the file of this patent
UNITED STATES PATENTS

| | | |
|---|---|---|
| 465,908 | Whiteside | Dec. 29, 1891 |
| 509,854 | Sawyer | Nov. 28, 1893 |
| 746,627 | Farmer | Dec. 8, 1903 |
| 1,691,889 | Meisel | Nov. 13, 1928 |
| 1,763,067 | Schaaff | June 10, 1930 |
| 1,932,629 | Maley | Oct. 31, 1933 |
| 2,041,943 | McCain | May 26, 1936 |
| 2,061,524 | Storck | Nov. 17, 1936 |
| 2,125,626 | Flood | Aug. 2, 1938 |
| 2,189,027 | Fuller | Feb. 6, 1940 |
| 2,239,060 | Sloan | Apr. 22, 1941 |
| 2,290,871 | Freedman | July 28, 1942 |
| 2,435,574 | Burns | Feb. 10, 1948 |
| 2,578,700 | Harrold | Dec. 18, 1951 |
| 2,638,038 | Marsh | May 12, 1953 |
| 2,655,098 | Dutro | Oct. 13, 1953 |
| 2,658,446 | Helsel | Nov. 10, 1953 |